United States Patent
Ludwig et al.

(10) Patent No.: US 7,031,999 B1
(45) Date of Patent: Apr. 18, 2006

(54) METHOD OF INTERCONNECTING COMPUTERS AND COMPUTER NETWORK

(75) Inventors: Heiko H. Ludwig, Zurich (CH); Keith G. Whittingham, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 09/433,427

(22) Filed: Nov. 4, 1999

(30) Foreign Application Priority Data

Nov. 17, 1998 (EP) .................................. 98121832

(51) Int. Cl.
*G06F 15/16* (2006.01)
(52) U.S. Cl. ...................... 709/202; 709/237; 709/249; 717/103
(58) Field of Classification Search ........ 709/201–203, 709/227–229, 238, 237, 249; 717/101–103
See application file for complete search history.

(56) References Cited

U.S. PATENT DOCUMENTS

| | | | | |
|---|---|---|---|---|
| 5,557,790 A * | 9/1996 | Bingham et al. | ........... | 707/101 |
| 5,557,798 A * | 9/1996 | Skeen et al. | ................... | 705/35 |
| 5,754,774 A * | 5/1998 | Bittinger et al. | ............ | 709/203 |
| 5,774,661 A | 6/1998 | Chatterjee et al. | .......... | 709/203 |
| 5,881,232 A * | 3/1999 | Cheng et al. | ................. | 707/10 |
| 6,157,934 A * | 12/2000 | Khan et al. | ................. | 345/747 |
| 6,167,409 A * | 12/2000 | DeRose et al. | ............. | 707/513 |
| 6,314,469 B1 * | 11/2001 | Tan et al. | ....................... | 704/8 |

FOREIGN PATENT DOCUMENTS

EP 0 793 184 A2 9/1997

OTHER PUBLICATIONS

Workflow Management Coalition, (1996) "Workflow Management Coalition Workflow Standard-Interoperability", http://www.aiim.org/wfmc/mainframe.htm: 13-14.

E.M. Verharen, et al.., (1998) "Introducing Contracting in Distributed Transactional Workflows", Proceedings of the thirty-first Hawaii International Conference on System Sciences (CAT. No. 98TB100216), Kohala Coast: 324-333 vol. 7.

(Continued)

*Primary Examiner*—Bunjob Jaroenchonwanit
*Assistant Examiner*—Victor Lesniewski
(74) *Attorney, Agent, or Firm*—Scully, Scott, Murphy & Presser; Gail H. Zarick, Esq.

(57) ABSTRACT

A method and a computer network for interconnecting a first server computer (112) of a service requestor (1) and a second server computer (122) of a service provider (2), each of the first server computer (112) and the second server computer (122) being connected to at least one client computer (111, 121), the first server computer (112) running a first workflow management system application (3), and the second server computer (122) running a second workflow management system application (4), the method comprising providing a first and a second connector application (5a, 6a) for permitting the first server computer (112) access to a copy of the first connector application (5a) and for permitting the second server computer (122) access to a copy of the second connector application (6a), wherein the copies of the first and the second connector application (5a, 6a) each comprises a connection agreement (8, 12) for a first work task (7) of a first workflow instance (18) encompassed by the first workflow management system application (3).

18 Claims, 1 Drawing Sheet

OTHER PUBLICATIONS

A. Dan, et al., (1998), "The Coyote Project: Framework for Multi-party E-Commerce", Research and Advanced Technology for Digital Libraries. Second European Conference, ECDL '98. Proceedings, Research and Advanced Technology for Digital Libraries: 873-889.

Yu Lei, et al., (1998), "Supporting distributed corporate planning through new coordination technologies", Proceedings Ninth International Workshop on Database and Expert Systems Applications: 59-565.

* cited by examiner

METHOD OF INTERCONNECTING COMPUTERS AND COMPUTER NETWORK

BACKGROUND OF THE INVENTION

1. Technical Field

The present invention generally relates to the art of connecting computers and specifically to a method of interconnecting at least two server computers, generally pertaining to differing corporate entities; each server being connected with a least one client computer and including, or having access to, a workflow control application.

2. Prior Art

Workflow control means and applications are well known in the art and operate with different media. Typical electronic workflow control applications (also termed Workflow Management System or WfMSs) are available commercially in various types and from various sources, e.g. in the form of specialized systems, such as "MQ Series Workflow®" from IBM or "TeamFlow®" from ICL, or as parts of so-called Enterprise Resource Planning Systems, such as R3® by SAP and Baan® by the Baan Company.

Today's systems of this type do not distinguish between and external view of a process that is visible outside the organization and its internal details. Their interfaces are generally aimed at the internal user. This is a problem if one organization (provider corporation) wants to perform a process on behalf of another (requestor corporation) so that it can be initiated and accessed by the requestor corporation through an automated interface and, vice versa, so that results generated by the provider can be reported back to the requestor.

This issue gains importance; specifically, an increasing need to outsource non-core business leads to increased service activity between separate companies. However, business organizations do not normally want to make internal information available to business partners nor do they wish to restrict their ability to conduct business internally. If separate organizations enter into a business relation, they will normally conclude an agreement or contract defining the circumstances under which the requestor corporation might initiate a process in the provider corporation and exchange further information when performing the process. As used herein, the term "contract" is a description of mutual obligations in the form of a protocol.

The use of server computers running a workflow control application in one and the same organization has been an issue for some time. Organizations want to deploy more than one server to balance workloads or to provide service at different sites that are connected by low bandwidth or only intermittently. If several servers are used, process templates have to be distributed as well as states and data of processes and activities. The various distributed parts have to be kept consistent. This problem has been discussed and described in the art; some solutions have been implemented in commercial products, such as IBM's MQ Series Workflow® mentioned above.

For the purpose of this specification, the terms "server" and "server computer" are used synonymously and refer to an electronic computer which functions as a "host" computer and is capable of being operatively connected with one or more "clients" (short for "client computer"). The connection of a server and at least one client results in a "net" (short for interconnected electronic computers).

A related issue is interoperability between workflow control applications of different vendors. Grown computer infrastructures tend to be heterogenous. This is a problem of providing standard interfaces to workflow control applications for server-to-server communication. Various attempts have been made at defining such an interface, e.g. by the 'Workflow Management Coalition', (a consortium of workflow control application vendors and users) which has created an interface called Interface 4 (cf. Technical Report WfMC-TC-1013, edited by the Workflow Management Coalition (1995), Hampshire, England The term "interface" is used to refer to a physical or virtual means capable of causing operative interconnection connection of physical and/or virtual entities.

These known interfaces help to cross vendor boundaries but do not cross corporate limits. Notably, such issues as privacy, flexibility and independence are not addressed because the relationship between internal (i.e. inter-corporate) and external (i.e. intra-corporate) interfaces is not a subject of such interfaces.

Another prior art attempt, i.e. the 'Wide Area Groupflow' system (cf. Nastanski et al; "Managing business process in virtual enterprises—interaction of distributed workflow mangament systems"; *Proceedings of the ESTIEM, IT-Vision Conference, Paderborn* (1997); and Riempp, G., et al, "Workflow management between distributed organizations—the wide area groupflow approach", in Lehner et. Al (ed.) *Proceedings of the ESTIEM, IT-Vision Conference; Deutscher Universitätsverlag, Wiesbaden* 1997) suggests to connect processes across organizational boundaries. While this approach addresses the issue of privacy, it requires that the organizations declare process templates as externably accessible. As a consequence, this approach does not provide a means to map an external representation of a process to an internal one, which implies a loss of independence and flexibility.

Agreements and contracts are known per se in various fields of transactions, workflow management, and distributed systems in general: A first prior art contract approach (cf. Wächter, H. Et al; "The ConTract Model", in Elmagarmid, A. K. (ed.) *Database Transaction Models for Advanced Applications*, San Mateo 1991) enables a performance of long-lived transactions of the type that can be perceived as processes, by committing, at an early stage, those parts of a transaction for which compensation mechanisms have been agreed upon.

Another prior art system termed "Coyote Approach" provides similar mechanisms while explicitly taking into account that services as parts of transactions can be executed in different organizations (cf. Dan, A. et al, "The Coyote Approach for Network—centric Service Applications; *Proceedings of the Workshop on High Performance Transaction Processing HPTP, Asilomar* 1997). The external services contemplated in this approach are short-lived, however. Similar properties are provided by the more recent TOWEC Approach (Verharen, E. M. et al, "Introducing contracting in distributing transactional workflow" in *Proceedings of the 31st Annual Hawai International Conference on System Science*, New York 1998); it allows closing contracts for process-type transaction steps rated 'very important'.

SUMMARY OF THE INVENTION

Now, the present invention is concerned with combining a contract approach with what is called a virtual enterprise co-ordinator (also termed VEC for short herein) explained in more detail below and developed to enrich such agreements by expressions for failure—responsibility of a process and to supervise these enriched agreements in the connector application having the function of a gateway. However, none of these approaches addresses terminology issues.

Accordingly, the present invention is directed to an improved method for interconnecting at least two server computers of different corporations, each of which is connected with at least one client computer, and wherein each server runs a workflow control application which may, but need not, be the same, and to solve the terminology problem to guard privacy and independence of operation.

The present invention is further directed to a computer network comprising at least two server computers each of which is connected with a least one client computer, and wherein each server computer is running a workflow control application.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Figure 1:
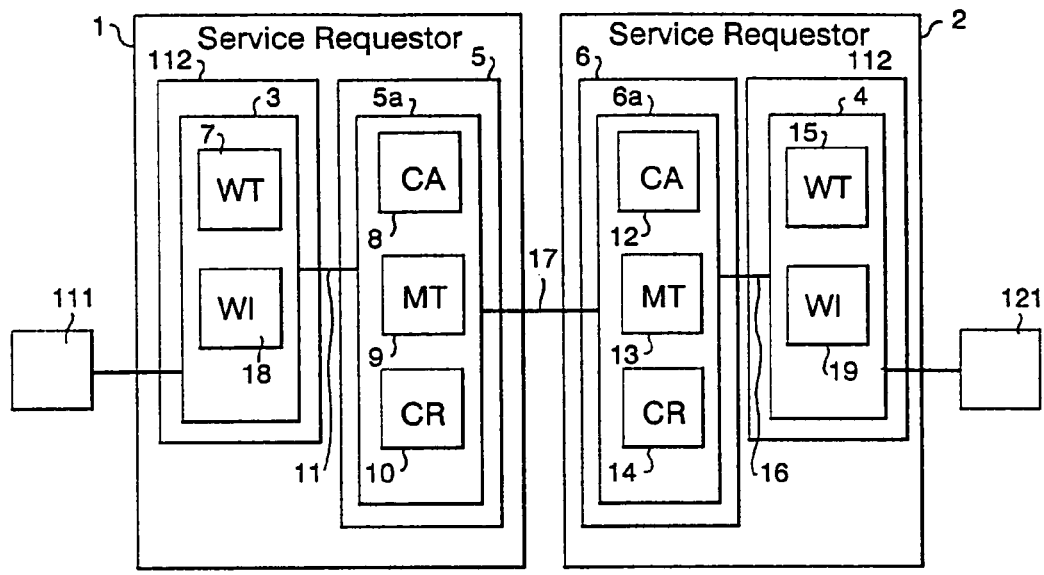
FIG. 1 shows a simple schematic view of interconnected server computers running workflow management system applications.

Now, according to a first embodiment the invention provides a method of interconnecting a first server computer of a service requestor and a second server computer of a service provider, each of said first server computer and said second server computer being connected to at least one client computer said first server computer running a first workflow management system application, and said second server computer running a second workflow management system application, said method comprising providing a first and a second connector application for permitting said first server computer access to a copy of said first connector application and for permitting said second server computer access to a copy of said second connector application, wherein said copies of said first and said second connector application each comprises a connection agreement for a first work task of a first workflow instance encompassed by said first workflow management system application which copy of said first connector application further comprises a first mapping table including a first service terminology and a common terminology, and which copy of said second connector application further comprises a second mapping table including a second service terminology and said common terminology, said first work task being transposed by said first mapping table from said first service terminology into an input data set in said common terminology, said input data set being marshalled to said second server computer over a common connection, and said marshalled input data set being transposed to a second work task by said second mapping table from said common terminology into said second service terminology, and said second work task being processed by said workflow management system application.

According to a second embodiment, the invention provides a computer network comprising a first server computer of a service requestor and a second server computer of a service provider, each of said first server computer and said second server computer being connected to at least one client computer, said first server computer running a first workflow management system application, and second server computer running a second workflow management system application, said first and second server computer being interconnected by means of a first and a second connector application arranged in such a manner that said first server computer having access to a copy of said first connector application and said second server computer having access to a copy of said second connector application, wherein said first and said second connector application each comprises a connection agreement for a first work task of a first workflow instance encompassed by said first workflow management system application, which copy of said first connector application further comprises a first mapping table including a first service terminology and a common terminology, and which copy of said second connector application further comprises a second mapping table including a second service terminology and said common terminology said first work task being transposed by said first mapping table from said first service terminology into an input data set in said common terminology, said input data set being marshalled to said second server computer over a common connection, and said marshalled input data set being transposed to a second work task by said second mapping table from said common terminology into said second service terminology, and said second work task being processed by said second workflow management system application.

According to a preferred embodiment, the results of the second work task of the second workflow management system application are transposed by the second mapping table from the second service terminology into an output data set in the common terminology, wherein the mapped output data set is marshalled to the first server computer over the common connection, and the marshalled output data are transposed by the first mapping table from said common terminology into said first service terminology.

According to another preferred embodiment, the first and second connector applications reside in a first and second access device of the service requestor and the service provider, wherein each access device comprises an access computer including the connector applications.

In a further preferred embodiment of the invention, the connector applications reside in the server computers of the service requestor and the service provider.

According to another preferred embodiment the connector applications reside in the client computers, which are connected to the service requestor server computer and to the service provider server computer.

The following description references FIG. 1. The service requestor organization 1 has service requestor server computer 112 with a workflow management system application (WfMS) 3 and one variant of an Access Device: 5 the Service Requestor's Access Device. The service provider 2 has service provider server computer 122 with a WfMS 4 and the other variant of an Access Device: 6 the Service Provider's Access Device.

Before a work task of a service requestor 1 can be outsourced to a service provider, several operations must be completed:

an accord between a service requestor and a service provider must be established either verbally in written form or by some other means, a workflow template must be established in the service requestor's WfMS 3 with one of the workflow's sub-tasks representing a work task 7 to be outsourced, a workflow template 15 must be established in the service provider's WfMS 4 to represent the processing of the whole outsourced work task 7, a connection agreement must be created and a copy is stored in the service requestor's Access Device at 8 and the service provider's Access Device at 12, mapping tables 9 and 13 describing how to map data items described in the workflow templates to data items described in the connection agreement are created and stored in the service requestor's Access Device 5 at 9 and the service provider's Access Device 6 at 13.

Once the above criteria have been established, the system is capable of outsourcing tasks. The following text is an overview of successfully processing a single outsourcing task using a previously established connection agreement 8 and 12 as described above. The device allows many instances of such a process using the same or different connection agreements to run concurrently.

A workflow instance 18 of a workflow template is created. Using a workflow interface 11 provided by the WfMS 3 the service requestor's Access Device 5 detects when the workflow reaches a point where it is appropriate to request the service provider to perform the outsourced work task 7. The correct connection agreement 8 is located, this indicates the details of the service provider 2 and the relevant data mapping table 9. According to this, information data is retrieved from the workflow instance 18 and marshalled into a format that can be interpreted by the service provider's Access Device; this is termed the input data ip1, ip2 (see also FIG. 2). The request to start the outsourced task together with said input ip1, ip2 is passed across a computer network 17 to the service provider's Access Device 6. On receiving the request the service provider's Access Device locates it's copy of the connection agreement 12; this indicates the mapping table 13 to use to marshal the input data and the name of a workflow template 15 for the outsourced task. The service provider's Access Device marshals the input data into the form defined in the workflow template using the mapping table 13. The service provider's Access Device then starts a new workflow instance 19 of the workflow template 15 using the WfMS workflow client computer interface 16. A connection record 14 is created and stored in persistent memory.

The service provider's Access Device 6 detects the completion of the workflow instance 19 using the workflow client computer interface 16 to the WfMS 4; the completion code and any output data of the workflow instance is retrieved. The connection record 14 is used to retrieve the mapping table 13 that is in turn used to marshal the data into the format that can be interpreted by the service requestor's Access Device 5, this is said to be the output data op1, op2. Said output data op1, op2 is then sent to the service requestor's Access Device across the computer network 17. The connection record 14 is removed from the system. On receiving the notification from the service provider's Access Device the service requestor's Access Device 5 retrieves the respective connection record 10. The connection record allows the correct mapping table 9 to be retrieved and used to translate the output data into the format define by the workflow template 7. The completion of the outsourced task is signalled and said translated data is passed to the WfMS 3 using the workflow client computer interface 11.

Figure 2:
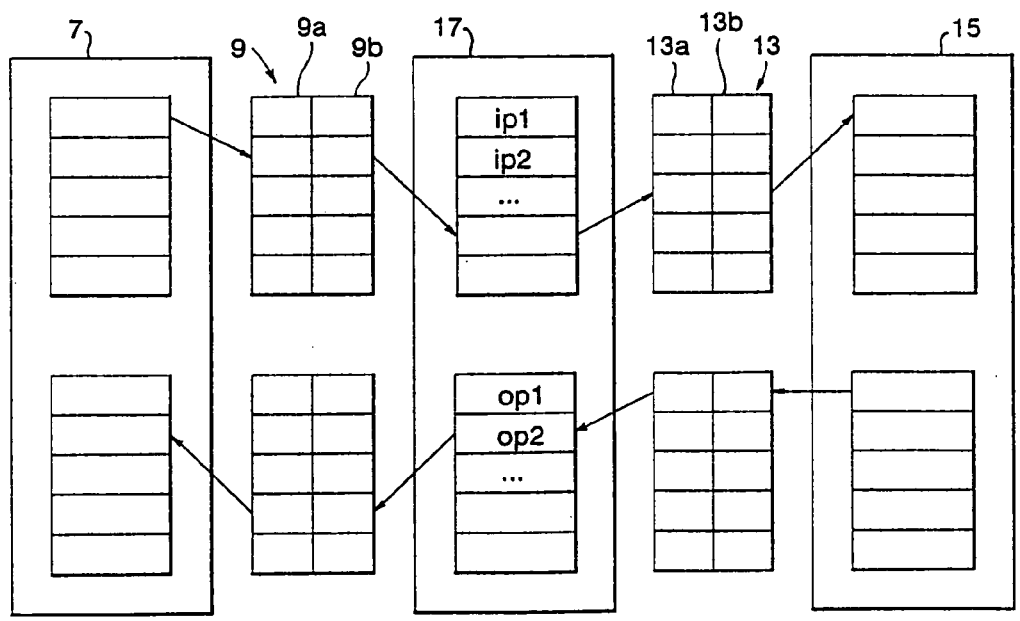
FIG. 2 shows a schematic view of parameter mapping of work tasks.

The mapping tables 9 and 13 for the purpose of this invention are described in more detail with reference to FIG. 2:

The mapping table 9 of the service request or maps the work task 7 from a first service terminology 9a into common terminology 9b. The result of this mapping are the input data ip1 and ip2, which are marshalled over the connection 17 to the mapping table 13 of the service provider. The mapping table 13 of the service provider maps the input data ip1, ip2 from the common terminology 13b to the second service terminology 13a for the work task 15 of the service provider. The result w01, w02 of the work task 15 of the service provider is mapped by the mapping table 13 of the service provider from the second service terminology 13a to common terminology 13b. This mapped result comprises the output data op1, op2 which are marshalled to the mapping table 9 of the service requestor. This mapping table 9 maps the output data op1, op2 from common terminology 9b to the first service terminology 9a, which output data serve as a result of the outsourced work task 7.

The inventions as described above allows the service requestor and the service provider to save privacy, flexibility and independence as follows:

Privacy: All communication from a process of sub-process to the outside or vice versa is sent through and controlled by the connection applications. No direct interaction between workflow control application of different organizations takes place. No information will be exchanged beyond what has been specifically defined in the agreement according to which the process and sub-process are connected.

Flexibility: By mapping the common view of a sub-process onto the respective internal representations, both organizations are free to modify on both individual and template level. However, an internal modification might entail the requirement for an organization to also change its mapping.

Independence: The gateway also protect co-operating processes in one organizations to be affected by internal changes to the process in the other as long as the modifying party carefully adapts the mapping and leaves its external interface unchanged.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A method of interconnecting a first server computer (112) of a service requestor (1) and a second server computer (122) of a service provider (2), each of said first server computer (112) and said second server computer (122) being connected to at least one client computer (111, 121);

said first server computer (112) running a first workflow management system application (3), and said second server computer (122) running a second workflow management system application (4);

said method comprising providing a first and a second connector application (5a, 6a) for permitting said first server computer (112) access to a copy of said first connector application (5a) and for permitting said second server computer (122) access to a copy of said second connector application (6a);

wherein said copies of said first and said second connector application (5a, 6a) each comprises a connection agreement (8, 12) for a first work task (7) of a first workflow instance (18) encompassed by said first workflow management system application (3);

which copy of said first connector application (5a) further comprises a first mapping table (9) including a first service terminology (9a) and a common terminology (9b, 13b), and which copy of said second connector application (6a) further comprises a second mapping table (13) including a second service terminology (13a) and said common terminology (9b, 13b);

said first work task (7) being transposed by said first mapping table (9) from said first service terminology (9a) into an input data set (ip1, ip2) in said common terminology (9b, 13b);

said input data set (ip1, ip2) being marshalled to said second server computer (122) over a common connection (17), and said marshalled input data set (ip1, ip2) being transposed to a second work task (15) by said second mapping table (13) from said common terminology (9b, 13b) into said second service terminology (13a), and said second work task (15) being processed by said second workflow management system application (4).

2. The method of claim 1 wherein said processed second work task (15) generates a result (wo1, wo2), said result (wo1, wo2) being transposed by said second mapping table (13) from said second service terminology (13a) into an output data set (op1, op2) in said common terminology (9b, 13b), said mapped output data set (op1, op2) being marshalled to said first server computer (112) over said common connection (17), and said marshalled output data being transposed by said first mapping table (9) from said common terminology (9b, 13b) into said first service terminology (9a).

3. The method of claim 1 wherein said copy of said first connector application (5a) resides in a first access device (5) of said service requestor (1); said first access device (5) comprising a first access computer including said first connector application (5a).

4. The method of claim 1 wherein said copy of said second connector application (6a) resides in a second access device (6) of said service provider (2); said second access device (6) comprising a second access computer including said second connector application (6a).

5. The method of claim 1 wherein said copy of the first connector application (5a) resides in said first server computer (112) of said service requestor (1).

6. The method of claim 1 wherein said copy of the second connector application (6a) resides in said second server computer (122) of said service provider (2).

7. The method of claim 1 wherein said copy of said first connector application (5a) resides in said first client computer (111).

8. The method of claim 1 wherein said copy of said second connector application (6a) resides in said second client computer (121).

9. The method of claim 1 wherein said first workflow management system application (3) is essentially the same as said second workflow management system application (4).

10. A computer network comprising a first server computer (112) of a service requestor (1) and a second server computer (122) of a service provider (2), each of said first server computer (112) and said second server computer (122) being connected to at least one client computer (111, 121);

said first server computer (112) running a first workflow management system application (3), and said second server computer (122) running a second workflow management system application (4);

said first and second server computer (112, 122) being interconnected by means of a first and a second connector application (5a, 6a) arranged in such a manner that said first server computer (112) having access to a copy of said first connector application (5a) and said second server computer (122) having access to a copy of said second connector application (6a);

wherein said first and said second connector application (5a, 6a) each comprise a connection agreement (8, 12) for a first work task (7) of a first workflow instance (18) encompassed by said first workflow management system application (3);

which copy of said first connector application (5a) further comprises a first mapping table (9) including a first service terminology (9a) and a common terminology (9b, 13b), and which copy of said second connector application (6a) further comprises a second mapping table (13) including a second service terminology (13a) and said common terminology (13b);

said first work task (7) being transposed by said first mapping table (9) from said first service terminology (9a) into an input data set (ip1, ip2) in said common terminology (9b, 13b);

said input data set (ip1, ip2) being marshalled to said second server computer (122) over a common connection (17), and said marshalled input data set (ip1, ip2) being transposed to a second work task (15) by said second mapping table (13) from said common terminology (9b, 13b) into said second service terminology (13a), and said second work task (15) being processed by said second workflow management system application (4).

11. The network of claim 10 wherein said processed second work task (15) generates a result (wo1, wo2), said result (wo1, wo2) being transposed by said second mapping table (13) from said second service terminology (13a) into an output data (op1, op2) in said common terminology (9b, 13b), said mapped output data set (op1, op2) being marshalled to said first server computer (112) over said common connection (17), and said marshalled output data being transposed by said first mapping table (9) from said common terminology (9b, 13b) into said first service terminology (2a).

12. The network of claim 10 wherein said copy of said first connector application (5a) resides in a first access device (5) of said service requestor (1), which first access device (5) comprises a first access computer including said first connector application (5a).

13. The network of claim 10 wherein said copy of said second connector application (6a) resides in a second access device (6) of said service provider (2), which second access device (6) comprises a second access computer including said second connector application (6a).

14. The network of claim 10 wherein said copy of the first connector application (5a) resides in said first server computer (112) of said service requestor (1).

15. The network of claim 10 wherein said copy of the second connector application (6a) resides in the second server computer (122) of said service provider (2).

16. The network of claim 10 wherein said copy of said first connector application (5a) resides in said first client computer (111).

17. The network of claim 10 wherein said copy of said second connector application (6a) resides in said second client computer (121).

18. The network of claim 10 wherein said first workflow management system application (3) is essentially the same as said second workflow management system application (4).

* * * * *